June 6, 1933.  W. J. TOBEY  1,912,414
FRUIT DRIER
Filed Aug. 5, 1929   2 Sheets-Sheet 2

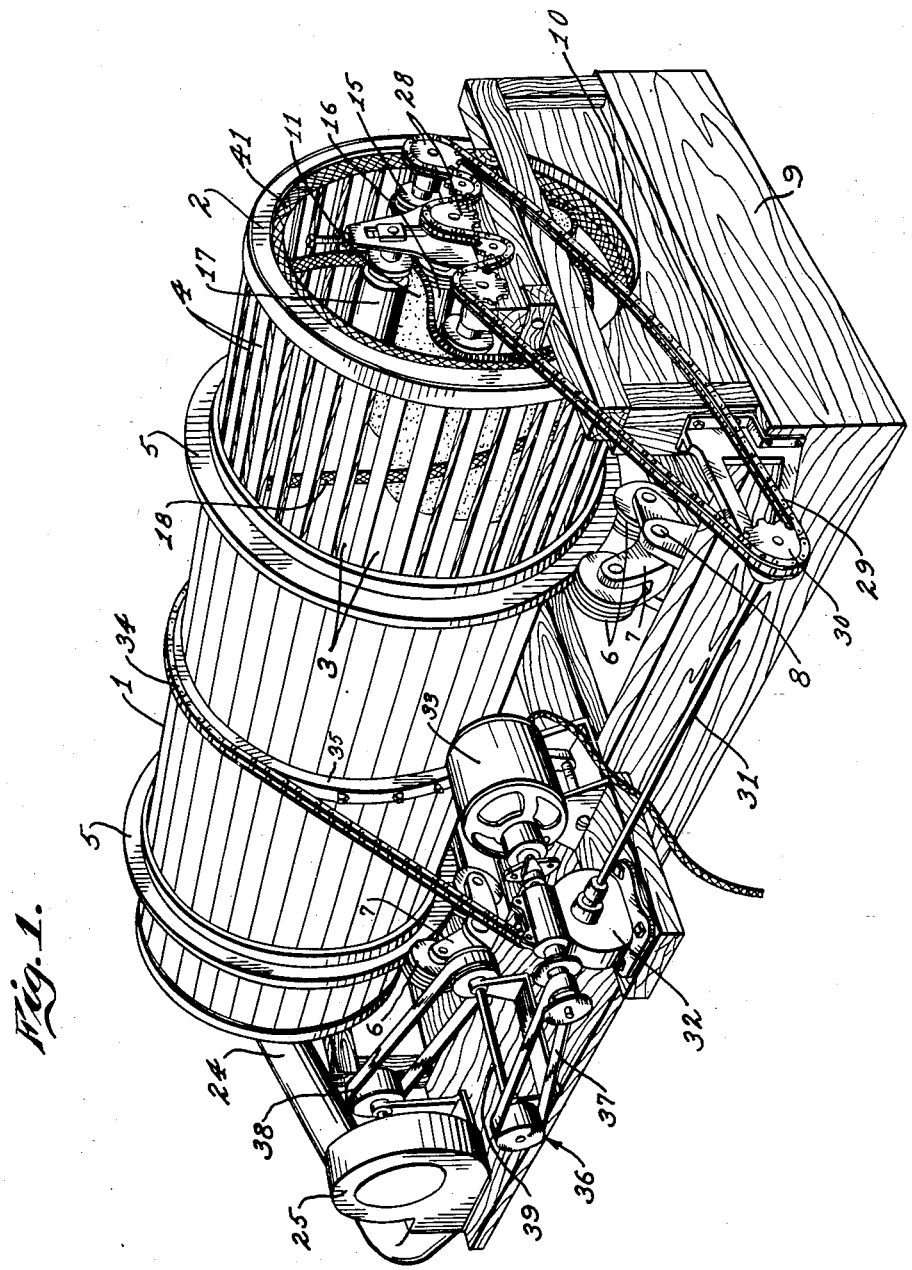

Inventor
William J. Tobey;
By Lyon & Lyon
Attorneys

Patented June 6, 1933

1,912,414

UNITED STATES PATENT OFFICE

WILLIAM J. TOBEY, OF RIVERSIDE, CALIFORNIA, ASSIGNOR TO STEBLER PARKER CO., OF RIVERSIDE, CALIFORNIA, A CORPORATION OF CALIFORNIA

FRUIT DRIER

Application filed August 5, 1929. Serial No. 383,619.

This invention relates to a fruit drier, and while features of the invention may be adapted to driers used for any purpose whatever, it is intended to be especially useful as a drier for citrus fruits or other fruits of their general shape.

Citrus fruits in shipment are apt to develop blue mold, and this is very apt to occur if the fruit is packed in a moist condition. Before packing such fruit, however, it is necessary to wash the fruit.

The general object of this invention is to provide a simple drier which can take the fruit delivered from the washer and which will effectively remove all the moisture from the fruit and dry the fruit so thoroughly that it will be ready for packing when leaving the drier.

A further object of the invention is to provide means for applying absorbent material to the surface of the fruit to remove the water from it and thereafter to subject the fruit to a drying air current.

A further object of the invention is to provide simple means for continuously removing the water from the absorbent material which removes the water from the fruit.

A further object of the invention is to provide a simple and compact drier for wiping the surface of the fruit with an absorbent and thoroughly drying the fruit, at the same time enabling the operation to be carried on continuously.

Further objects of the invention will appear hereinafter.

The invention consists in the novel parts and combinations of parts to be described hereinafter, all of which contribute to produce an efficient fruit drier.

A preferred embodiment of the invention is described in the following specification, while the broad scope of the invention is pointed out in the appended claims.

In the drawings:

Figure 1 is a perspective of the drier embodying my invention showing the receiving end of the drier in the foreground, with the feed trough or hopper removed so as to expose the receiving end of the drier to view.

Figure 3:
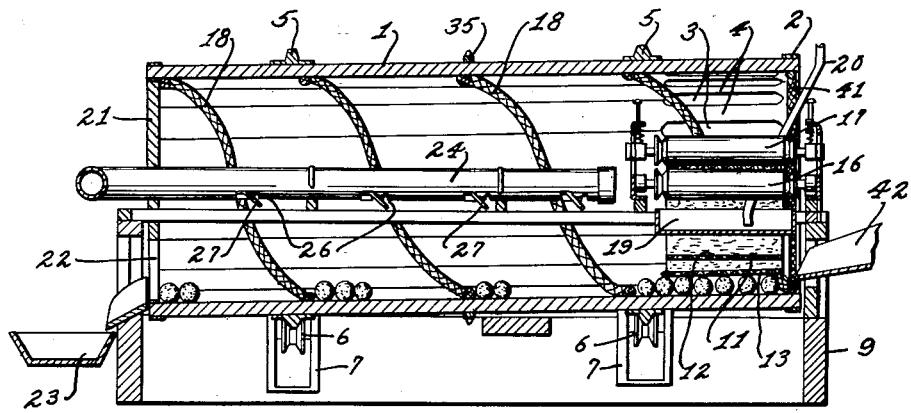
Figure 3 is a longitudinal section through the drier.

In practicing my invention I provide means for supporting the fruit and for effecting a rotation of the fruit as the fruit passes through the drier, and I also provide absorbent means for engaging the fruit to wipe it and remove the water from it. Beyond this absorbent means, and before the fruit passes out of the drier, it is preferably subjected to a drying air current.

The drier for effecting these operations may have any general construction desired but in the present specification I have illustrated the invention as applied to a drier of rotary drum type.

Referring more particularly to the parts, and particularly to Figure 1, 1 represents an elongated rotary drum or barrel mounted for rotation on its longitudinal axis. The axis of the drum may be horizontal, but is preferably slightly tilted with respect to a horizontal line so that the receiving end 2 of the drum is slightly elevated. This end of the drum is preferably formed with perforations which may be in the form of slots 3 produced between bars or slats 4 that form the wall of the drum at the receiving end. The body of the drum is preferably formed with a solid wall. This drum may be constructed of sheet metal or, if desired, it may be constructed of wood. It is mounted for rotation on its longitudinal axis, for which purpose the exterior of the drum is provided with two circumferential flanges, or runners, 5 that rest on grooved rollers 6. These rollers 6 are preferably disposed in pairs, each pair of rollers being mounted for rotation on an equalizing cross-head 7 pivotally mounted at 8 on the frame 9 of the drier. The fruit to be dried is fed into the interior of the drum at its bottom at the point 10 (see Fig. 1), and as the drum rotates, the fruit is brought into contact with absorbent means mounted within the receiving end of the drum.

This absorbent means may be mounted in any suitable manner but is preferably in the form of a continuous moving apron 11, said apron including a body or web 12 of canvas belting or similar material carrying a plurality of wipers 13 of ordinary toweling, said wipers being attached at their forward edges 14 (with respect to the direction of movement of the apron) to the web.

Figure 2:
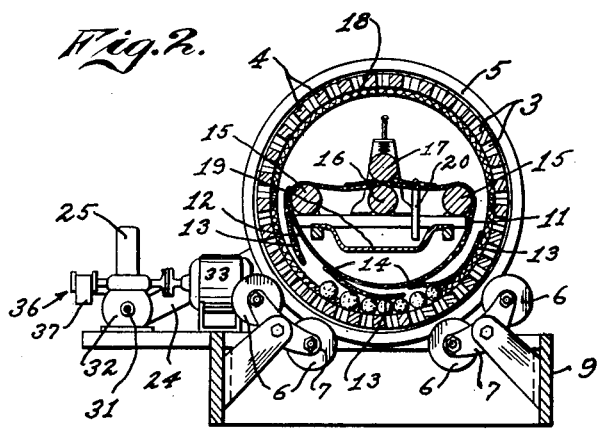
Figure 2 is a vertical cross section through the receiving end of the drier.

The manner in which the absorbent means is applied to the fruit is indicated in Figure 2. The apron is continuously driven, and associated with the apron I provide means for continuously removing the water collecting in the apron. For this purpose I provide in the receiving end of the drum a plurality of rollers 15, which preferably include a pair of rollers disposed on opposite sides of the central plane passing through the drum, and a central roller 16 which cooperates with an upper roller 17 to form a wringer. This upper roller is pressed down by spring pressure so as to subject the apron as it passes to a yielding pressure, thereby removing the water from it.

The interior of the drum is constructed so as to effect the general movement of the fruit through it and from the receiving end toward the delivery end of the drum. For this purpose the interior of the drum is provided with guides 18 which are preferably in the form of ropes attached to the interior of the drum in helical lines. There are preferably two of these guide ropes 18 which are disposed 180° apart.

The direction of rotation is such that these ropes 18 gradually move the fruit toward the delivery end of the drum if the drum is on a horizontal axis. If the drum is tilted slightly to a horizontal line, these ropes of course have the effect of retarding the movement to the delivery end. The water which is wrung from the apron may be collected in a small basin 19 which is hung under the wringer rollers 16, 17. If desired, a pipe 20 may be provided leading off from this basin for carrying off the water as it collects.

The delivery end of the drum is closed by a relatively fixed head 21, the lower portion of which is cut away to provide an opening 22 through which the fruit can pass into a collecting trough 23. Any suitable means may be provided for subjecting the fruit within the body of the drum to the drying air current. In the present instance this is accomplished by means of an air pipe 24 which passes in through the center of the head 21 and which is supplied with air from a blower 25.

The under side of the pipe 24 within the drier is provided with a plurality of slots 26, and adjacent these slots deflector plates 27 are provided for directing the air in an inclined direction down onto the fruit. In this way as the fruit rolls over and over in progressing along through the drum, its surface is subjected to this air current.

Any suitable means may be provided for driving the rollers 15 and the wringer. In the present instance the lower wringer roller 16 and the rollers 15 are provided with sprocket wheels 28 which carry an endless sprocket chain 29 driven by a driving sprocket 30 on a side shaft 31. This shaft 31 may be driven in any suitable manner. In the present instance it is driven through a worm gear drive 32 actuated by an electric motor 33 mounted on the frame 9 of the drier. This worm drive 32 also affords means for driving an endless sprocket chain 34 which passes around the large sprocket ring 35 formed on the body of the drum.

The blower 25 may be driven through suitable belt gearing 36, including a belt 37 driven off of the shaft beyond the worm gearing, and a second belt 38 driven from a countershaft 39, and which drives a belt pulley 40 on the shaft of the blower.

The end of one of the ropes 18 is attached around the interior of the receiving end of the drum so as to form a retaining flange 41 to prevent any possibility of the fruit rolling out of the receiving end of the drum. The fruit may be fed into the drum at the point 10 through a suitable feed trough 42 having a slightly inclined bottom (see Fig. 3).

In the operation of the drier, the fruit is delivered into the receiving end of the drum through the mouth or opening at 10 so that as the drum is rotated and as the apron 11 is driven, the fruit is rolled over and over and subjected to the wiping action by the absorbent material of the apron. After the fruit has passed by the apron, it passes on through the body of the drum where it is subjected to the drying air current from the air pipe 24 (see Fig. 3). The water collecting in the pan 19 may be drawn off from time to time through the pipe 20.

It is understood that the embodiment of the invention described herein is only one of the many embodiments this invention may take, and I do not wish to be limited in the practice of the invention, nor in the claims, to the particular embodiment set forth.

The air current that comes up through the body of the drier assists in drying the wipers and the web carrying the same.

What I claim is:

1. In a fruit drier, the combination of a rotary drum for supporting the fruit on its interior, and an endless apron mounted within the drum and having absorbent means engaging the upper side of the fruit.

2. In a fruit drier, the combination of a rotary drum for supporting the fruit on its interior, an endless apron mounted within the drum and having absorbent means engaging the upper side of the fruit, and means for continuously moving the apron.

3. In a fruit drier, the combination of a rotary drum for supporting the fruit on its interior, an endless apron mounted within the drum and having absorbent means engaging the upper side of the fruit, means for continuously moving the apron, means for effecting general movement of the fruit longitudinally within the drum, and means for subjecting the fruit within the drum to a drying air current.

4. In a fruit drier, the combination of a rotary drum mounted for rotation on an axis slightly inclined to the horizontal, for supporting the fruit on its interior, an endless apron mounted within the drum at its elevated end and having absorbent means engaging the fruit.

5. In a fruit drier, the combination of a rotary drum, mounted for rotation on an axis slightly inclined to the horizontal, for supporting the fruit on its interior, an endless apron mounted within the drum at its elevated end and having absorbent means engaging the fruit, and means associated with the apron for removing the water collected by the apron and its absorbent means.

6. In a fruit drier, the combination of a rotary drum mounted for rotation on an axis slightly inclined to the horizontal, for supporting the fruit on its interior, an endless apron mounted within the drum at its elevated end and having absorbent means engaging the fruit, means associated with the apron for removing the water collected by the apron and its absorbent means, and means for collecting the water removed from the apron.

7. In a fruit drier, the combination of a rotary drum for supporting the fruit on its interior, an endless apron mounted within the drum and having absorbent means engaging the fruit, a ringer associated with the apron for removing the water collecting in the same, guiding means on the interior of the drum for causing the fruit to move longitudinally of the drum, and means for subjecting the fruit within the drum beyond the apron to a drying air current.

8. In a fruit drier, the combination of a rotary drum mounted for rotation on an axis inclined to the horizontal, the elevated end of said drum having perforations through the wall thereof, and operating as the receiving end for the fruit, absorbent means with means for bringing the same into contact with the fruit in the receiving end of the drum, and means for subjecting the fruit to a drying air current within the body of the drum.

9. In a fruit drier, the combination of a rotary drum for supporting the fruit on its interior, said drum having absorbent means with means for effecting contact between the absorbent means and the fruit passing through the drum.

10. In a fruit drier, the combination of a rotary drum for supporting the fruit on its interior, said drum having a receiving end with absorbent means within the same for engaging the fruit to remove the moisture therefrom, means for guiding the fruit through the drum, and means for subjecting the fruit to a drying air current as it passes through the drum.

11. In a fruit drier, the combination of a rotary drum for supporting the fruit on its interior, and absorbent means mounted within the drum operating to engage the fruit and remove the water therefrom as the fruit passes through the drum.

12. In a fruit drier, the combination of a rotary drum mounted for rotation with its axis inclined to the horizontal and with the elevated end of the drum operating as a receiving end for the fruit, an endless apron mounted in the receiving end of the drum carrying absorbent means for wiping across the upper face of the fruit lying on the interior of the drum, means for wringing the water from the absorbent means of the apron, means for guiding the fruit along the drum toward its delivery end, means for subjecting the fruit within the drum to a drying air current, and means for continuously rotating the drum.

13. In a fruit drier, the combination of a rotary drum for supporting the fruit on its interior, and an endless apron mounted within the drum and having absorbent means engaging the fruit to dry the same.

Signed at Riverside, California, this 17th day of July, 1929.

WILLIAM J. TOBEY.